United States Patent Office 3,135,783
Patented June 2, 1964

3,135,783
PROCESS FOR THE MANUFACTURE OF UNSATURATED NITRILES
Kurt Sennewald, Wilhelm Vogt, and Joachim Kandler, Knapsack, near Cologne, and Rolf Sommerfeld, Neu-Berrenrath, Germany, assignors to Knapsack-Griesheim Aktiengesellschaft, Knapsack, near Cologne, Germany, a corporation of Germany
No Drawing. Filed Dec. 20, 1960, Ser. No. 77,030
Claims priority, application Germany Jan. 2, 1960
4 Claims. (Cl. 260—465.3)

The present invention relates to a process for the manufacture of unsaturated nitriles by reacting olefins on catalysts with air and ammonia.

Processes are known for the transformation of propylene into acrylonitrile wherein propylene is catalytically reacted with oxygen or air and ammonia in the gaseous phase. In some of these processes propylene is first reacted on a catalyst with oxygen or air to yield acrolein. In a second process stage the acrolein is reacted with further amounts of oxygen or air and with ammonia to acrylonitrile. In the second stage $MoO_3$-containing catalysts are preferably used. The disadvantages of these processes reside in the fact that the acrolein forms by-products with ammonia, preferably pyridine compounds such as $\beta$-picoline, and that the acrolein polymerizes and causes operating troubles.

In another known process propylene is reacted to form acrylonitrile with the simultaneous addition of oxygen or air and ammonia. In this process there is likewise used a $MoO_3$-containing catalyst which however, gives rise to the formation of acrolein when only a deficiency of ammonia is present or in the absence of ammonia. Thus acrolein is formed as intermediate product in this process, too. It is therefore a disadvantage of said process that varying amounts of acrolein can be formed, depending on the amount of ammonia added, which may lead to obstructions due to polymerization. A further disadvantage of said known process resides in the fact that in addition to acrylonitrile considerable amounts of acetonitrile are formed which must then be separated from the acrylonitrile. Finally, in the course of time valuable $MoO_3$ is removed from the catalyst on account of its volatility, so that the activity of the catalyst is reduced.

It has now surprisingly been found that propylene can be transformed with a good yield in one stage with oxygen or air and ammonia on catalysts that are free from $MoO_3$. An advantage of the process of the invention is that, independent of the proportion ammonia:propylene, practically no acrolein is formed whereby the danger of polymerization is reduced. On the catalysts used in accordance with the invention no acrolein is formed from a plopylene-oxygen or propylene-air mixture even in the absence of ammonia. Consequently, in the present process acrolein cannot be regarded as intermediate product. Probably the oxygen primarily acts on the ammonia and not on the propylene. The intermediate oxidation product of ammonia that is possibly formed can then react directly with propylene. However, for the industrial application of the process the reaction mechanism is only of minor importance. A further advantage of the present process is the fact that in addition to the desired acrylonitrile only an immaterial amount of acetonitrile is formed which can be readily separated. The amount of acetonitrile formed is less than 3%, calculated on the amount of acrylonitrile formed. Moreover, it is advantageous that the use of expensive $MoO_3$, which would be easily removed from the catalyst under the reaction conditions, can be dispensed with.

More especially the process for the manufacture of unsaturated nitriles by reacting olefins with air and ammonia on catalysts in accordance with the invention is carried out as follows: the olefinic hydrocarbon is treated, if desired after the addition of steam, with air and/or oxygen and ammonia at elevated temperature in the presence of a catalyst of the general composition

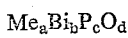

$$Me_aBi_bP_cO_d$$

wherein $a$, $b$, $c$ and $d$ represent the number of atoms each time and $a$ stands for 1, $b$ for 0 to 10.5, $c$ for 0 to 3.5 and $d$ for 1–26, and Me is at least one metal of the first transition period of the Periodic System of the elements. The catalyst used in the present process is a mixture of oxides of the metals of the first transition period. In the above formula Me suitably represents Fe, Co, Ni, V, Mn or Cr. The metals of the first transition period of the eighth subgroup are particularly advantageous. Above all iron oxide can be used, especially as a binary mixture with bismuth oxide or in admixture with one or several oxides of the type mentioned above. In the catalyst the metals of the first transition period and bismuth and phosphorus are present in the form of their oxides. Consequently the catalysts may contain small amounts of phosphorus pentoxide but this is not critical. The addition of too large an amount of $P_2O_5$ may impair the yield. In order to find out the proportion by weight of the individual elements in the catalyst, the data represented by $a$, $b$, $c$, and $d$ must be multiplied by the respective atomic weight.

The catalyst of the invention is advantageously applied to a carrier. Especially favorable is the use of silicon dioxide which can be employed in any form, for example as a colloidal solution together with the solutions of the metal salts, or in pieces, predried or sintered.

The selectivity of the aforesaid catalysts is improved by the addition of bismuth oxide so that it is especially favorable to use mixtures of oxides of the metals of the first transition period with bismuth oxide. The molecular proportion of the transition elements to bismuth can vary within wide limits. The catalyst may contain 0 to about 80 mol percent of $Bi_2O_3$, calculated on the catalyst mass free from carrier, so that the process of the invention is not limited to catalysts containing bismuth.

For the preparation of the catalysts of the invention for example silica gel as carrier is added to an aqueous solution of appropriate metal salts and, if desired, phosphoric acid, the whole is evaporated to dryness and the residue to calcined at elevated temperature. As metal salts there are preferably used the nitrates, if desired in nitric acid solution, or the ammonium salts. The silicon dioxide is used as carrier in colloidal form or silica gel is employed in pieces preferably having a diameter of about 2 to 4 mm. The catalyst mass is calcined at a temperature in the range from about 300 to 1,100° C. and preferably about 400 to 600° C. The catalyst is subsequently activated by heating it in an air-ammonia current containing about 10–20% by volume of ammonia at a temperature which approximately corresponds to the calcination temperature.

The catalyst of the invention can either be employed in concentrated form, or preferably in combination with a carrier, as already mentioned. In addition to silica gel silicon dioxide other inert materials can be used as carrier, such as silicon carbide, aluminum oxide, pumice or mixtures thereof. The catalytically active compounds can be applied to the carrier, for example by impregnating the latter with an aqueous solution of the said compounds or by any other method.

The olefinic hydrocarbons are reacted with air and/or oxygen and ammonia on the catalyst at a temperature in the range from about 250° C. to 600° C. at a pressure in the range from about 0.1 to 10 absolute atmospheres.

The flowing rate and the time of stay of the gas mixture on the catalyst depend on the optimum temperature in each case. The pressure in the reactor is not very critical. In general the process is carried out under a pressure ranging from atmospheric pressure to about 3 absolute atmospheres and at a temperature in the range from about 375° C. to 550° C. The time of stay of the olefin/air/amonia mixture on the catalyst ranges from about 0.05 second to 50 seconds and preferably from about 0.2 second to 20 seconds.

The quantitative proportions of the gases in the mixture are not very important since even with a deficiency of ammonia no acrolein is formed. A proportion by volume of olefinic hydrocarbon to ammonia to air of about 1:1:7.5 has proved to be particularly favorable.

The reaction gases can be admixed with varying amounts of inert gases or diluents such as steam, carbon dioxide or nitrogen. By this measure the temperature in the reactor is maintained as uniform as possible and the formation of overheated zones is avoided. The required amount of inert gas is largely influenced by and depends on the type and design of the reactor and the thickness of the catalyst layer.

The catalyst of the invention can be used as a solid bed catalyst or as a whirling or fluidized bed catalyst.

By the process of the present invention acrylonitrile is made from propylene, or, for example, methacrylonitrile from isobutylene and so on. In general the carbon chain is not modified. However, under especially severe conditions a nitrile with a shortened chain can be formed, for example acrylonitrile from isobutylene.

The following examples serve to illustrate the invention but they are not intended to limit it thereto. Examples 1–5 are directed to the manufacture of the catalyst used in accordance with the invention while Examples 6–8 describe the manufacture of acrylonitrile from propylene, air and ammonia with the use of the catalysts of the invention.

*Example 1*

73 grams of $Bi(NO_3)_3 \cdot 5H_2O$ were dissolved in 50 cc. of $H_2O$ and 5 cc. of concentrated $HNO_3$ (solution I). 61 grams of $Fe(NO_3)_3 \cdot 9H_2O$ were dissolved in 100 cc. of $H_2O$ (solution II). The two solutions were mixed with one another and 2.5 cc. of phosphoric acid of 85% strength were added. 200 grams of silica gel in pieces having a diameter of 2 to 4 mm. were introduced into the combined solution and the mixture was evaporated to dryness. The catalyst obtained was dried for 12 hours at 110° C. and then calcined for 10–20 hours in an air current at about 500° C. The air was then admixed with 10 to 20% by volume of ammonia and the catalyst was heated for a further 2 to 5 hours whereby it was activated. It contained about 14.2% by weight of $Bi_2O_3$, 4.9% by weight of $Fe_2O_3$ and 1.0% by weight of $P_2O_5$. The rest was $SiO_2$. This corresponded, without regard to the silicon dioxide as carrier, to a catalyst composition of 44.5 mol percent of $Fe_2O_3$, 44.5 mol percent of $Bi_2O_3$ and 11 mol percent of $P_2O_5$.

*Example 2*

242 grams of $Fe(NO_3)_3 \cdot 9H_2O$ were dissolved in 400 cc. of water with the addition of 2.5 cc. of phosphoric acid of 85% strength. 200 grams of silica gel in the form of pieces having a diameter of 2 to 4 mm. were introduced into the solution and the mixture was evaporated to dryness. The catalyst was then further treated as described in Example 1. The treated catalyst contained about 19.3% by weight of $Fe_2O_3$ and 1.0% by weight of $P_2O_5$. The rest was $SiO_2$. This corresponded, without regard to the silicon dioxide as carrier, to a catalyst composition of 94.5 mol percent of $Fe_2O_3$ and 5.5 mol percent of $P_2O_5$.

*Example 3*

73 grams of $Bi(NO_3)_3 \cdot 5H_2O$ were dissolved in 50 cc. of water and 5 cc. of concentrated $HNO_3$ (solution I). 44 grams of $Ni(NO_3)_2 \cdot 6H_2O$ were dissolved in 100 cc. of water (solution II). The two solutions were combined and 2.5 cc. of phosphoric acid of 85% strength were added. 200 grams of silica gel in pieces were introduced into the combined solution and the mixture was then evaporated to dryness. The catalyst was further treated as described in Example 1. The treated catalyst contained about 14.1% by weight of $Bi_2O_3$, 4.5% by weight of NiO and 1.0% by weight of $P_2O_5$. The rest was $SiO_2$. Without regard to the silicon dioxide this corresponded to a catalyst composition of 61.5 mol percent of NiO, 31.0 mol percent of $Bi_2O_3$ and 7.5 mol percent of $P_2O_5$.

*Example 4*

73 grams of $Bi(NO_3)_3 \cdot 5H_2O$ were dissolved in 50 cc. of $H_2O$ and 5 cc. of concentrated $HNO_3$ (solution I). 61 grams of $Fe(NO_3)_3 \cdot 9H_2O$ were dissolved in 100 cc. of water (solution II). 4.25 grams of $NH_4VO_3$ were dissolved in 100 cc. of $H_2O$ (solution III). The three solutions were combined, 2.5 cc. of phosphoric acid of 85% strength and 200 grams of silica gel in pieces were added and the whole was evaporated to dryness. The catalyst was further treated as described in Example 1. The treated catalyst contained about 13.9% by weight of $Bi_2O_3$, 4.8% weight of $Fe_2O_3$, 1.3% weight of $V_2O_5$ and 1.0% by weight of $P_2O_5$. The rest was silicon dioxide. Without regard to the silicon dioxide, this corresponded to a catalyst composition of 40.0 mol percent of $Fe_2O_3$, 40.0 mol percent of $Bi_2O_3$, 10.0 mol percent of $V_2O_5$ and 10.0 mol percent of $P_2O_5$.

*Example 5*

A catalyst was prepared as described in Example 1 but without the addition of phosphoric acid. Without regard to the silicon dioxide as carrier the catalyst was composed of 50.0 mol percent of $Fe_2O_3$ and 50.0 mol percent of $Bi_2O_3$.

*Example 6*

About 200 cc. of the catalyst described in Example 1 were filled into an oxidation reactor and a mixture of 116 liters of air, 15.5 liters of propylene, 15.5 liters of ammonia and 55 liters of steam were introduced per hour. The temperature was varied as shown in the following table:

| Temperature in the reactor | Yield calculated on reacted propylene | |
|---|---|---|
| | Acrylonitrile, percent | Acetonitrile, percent |
| 400° C. | 69 | 1.5 |
| 425° C. | 62 | 1.4 |
| 450° C. | 53 | 1.4 |

*Example 7*

About 200 cc. of the catalyst described in Example 1 were filled into an oxidation reactor. At a temperature of 450° C. in the reactor, 116 liters of air, 15.5 liters of propylene and 55 liters of steam were introduced per hour. The amount of ammonia was varied as shown in the following table:

| Liters $NH_3$ per hour | Yield calculated on reacted propylene | |
|---|---|---|
| | Acrylonitrile, percent | Acrolein, percent |
| 0 | 0 | <0.05 |
| 8.0 | 38 | 0 |
| 15.5 | 53 | 0 |

*Example 8*

About 200 cc. of a catalyst prepared according to one of the Examples 1 to 5 were filled into an oxidation reactor. At a temperature of 400° C. 116 liters of air, 15.5 liters of propylene, 15.5 liters of ammonia and 55 liters of steam were introduced per hour.

| Catalyst | Yield calculated on reacted propylene | |
|---|---|---|
| | Acrylonitrile, percent | Acetonitrile, percent |
| $Fe_2O_3/Bi_2O_3/P_2O_5$ | 69 | 1.5 |
| $Fe_2O_3/P_2O_5$ | 30 | 0.8 |
| $NiO/Bi_2O_3/P_2O_5$ | 53 | about 1.5 |
| $Fe_2O_3/V_2O_5/Bi_2O_3/P_2O_5$ | 63 | 1.4 |
| $Fe_2O_3/Bi_2O_3$ | 55 | 1.2 |

We claim:

1. In a process for the manufacture of a compound selected from the group consisting of acrylonitrile and methacrylonitrile by reacting a gas selected from the group consisting of propylene and isobutylene respectively, with ammonia and at least one substance selected from the group consisting of air and oxygen at a temperature of about 250 to 600° C. under a pressure of about 0.1 to 10 absolute atmospheres on a catalyst applied to a carrier member selected from the group consisting of silica gel, silicon dioxide, silicon carbide, aluminum oxide, pumice, and mixtures thereof, and with a time dwell of the gas mixture on the catalyst between 0.05 to 50 seconds, the improvement of using as catalyst a member selected from the following group consisting of:

$Fe_2O_3/Bi_2O_3/P_2O_5$
$NiO/Bi_2O_3/P_2O_5$
$Fe_2O_3/V_2O_5/Bi_2O_3/P_2O_5$; and
$Fe_2O_3/Bi_2O_3$ 2. A process as claimed in claim 1, wherein the reaction is carried out with about 1 part by volume of propylene, 1 part of ammonia, 7.5 parts of air and at least one additional diluent selected from the group consisting of steam, carbon dioxide and nitrogen, at a temperature in the range of 375° C. to 550° C., under a pressure ranging from atmospheric pressure to about 3 absolute atmospheres, and with a time dwell of the gas-mixture on the catalyst between 0.2 to 20 seconds.

3. A process as claimed in claim 2, wherein the catalyst is activated by heating it in an air/ammonia current which contains about 10 to 20% by volume of ammonia.

4. A process as claimed in claim 2, wherein the reaction is carried out in a fluidized bed reactor.

References Cited in the file of this patent

UNITED STATES PATENTS

| 2,481,826 | Cosby | Sept. 13, 1949 |
| 2,904,580 | Idol | Sept. 15, 1959 |
| 3,009,943 | Hadley | Nov. 21, 1961 |